United States Patent

[11] 3,608,717

| [72] | Inventors | David G. Strubel<br>Jeffersontown;<br>Nicholas E. Ludwig, Louisville, both of Ky. |
|---|---|---|
| [21] | Appl. No. | 838,158 |
| [22] | Filed | July 1, 1969 |
| [45] | Patented | Sept. 28, 1971 |
| [73] | Assignee | Brown & Williamson Tobacco Corporation<br>Louisville, Ky.<br>Continuation-in-part of application Ser. No.<br>750,131, Aug. 5, 1968, now abandoned.<br>This application July 1, 1969, Ser. No.<br>838,158 |

[54] METHOD AND APPARATUS FOR THE LIQUID SEPARATION OF A MIXTURE OF MATERIALS
4 Claims, 3 Drawing Figs.

| [52] | U.S. Cl. | 209/172, 209/173 |
|---|---|---|
| [51] | Int. Cl. | B03b 3/40 |
| [50] | Field of Search | 209/2, 3, 4, 12, 17, 162–165, 168, 172, 172.5, 173, 355 |

[56] References Cited
UNITED STATES PATENTS

| 989,167 | 4/1911 | Loison | 209/355 |
|---|---|---|---|
| 1,159,044 | 11/1915 | Kelly | 209/164 X |
| 2,205,942 | 6/1940 | Cross | 209/162 |
| 1,754,923 | 4/1930 | Wiegand | 209/173 |
| 1,887,239 | 11/1932 | Hansen | 209/173 |
| 2,828,860 | 4/1958 | Morris | 209/4 |
| 3,322,271 | 5/1967 | Edwards | 209/2 |
| 3,344,918 | 10/1967 | Leonard | 209/172.5 X |

FOREIGN PATENTS

| 887,492 | 1/1962 | Great Britain | 209/172.5 |

*Primary Examiner*—Frank W. Lutter
*Assistant Examiner*—Ralph J. Hill
*Attorney*—Kane, Dalsimer, Kane, Sullivan and Kurucz

ABSTRACT: Method for separating particles of different specific gravities and absorption characteristics in a heavy liquid medium.

3,608,717

METHOD AND APPARATUS FOR THE LIQUID SEPARATION OF A MIXTURE OF MATERIALS

REFERENCE TO RELATED APPLICATION

This application is a Continuation-In-Part of our previously filed application, Ser. No. 750,131 filed on Aug. 5, 1968, now abandoned, the subject matter of which is incorporated herein by reference.

BACKGROUND OF THE INVENTION

Separation of a mixture by controlling the specific gravity of a liquid medium has been practiced for ore separation, for example, metals from sand or rock, sand or slate from coal, coke from cinder, or the separation of seed from chaff, bad seed or sand. A considerable problem exists in separating a mixture having relatively the same particle size and mass and in which the component parts have varying specific gravities such as a mixture of foliaceous material and sand having relatively small particle sizes. Separation procedures which employ mechanical methods are inefficient in the separation of such a mixture. Sand has a tendency to adhere to the foliaceous material so that separation of the sand from the foliaceous material is difficult.

SUMMARY OF THE Invention

Method and apparatus for the liquid separation of a mixture having a plurality of component parts of differing specific gravities and absorption characteristics with one of the component parts being a botanical material. The mixture is passed into a first separation zone having a liquid medium therein with a specific gravity intermediate the specific gravity range of the botanical material. The mixture is retained in said first zone until an intermediate portion of said mixture including botanical material absorbs an amount of said liquid medium and approaches the specific gravity of the liquid medium and separates from the remainder of said mixture.

The part of the remainder of the mixture having a specific gravity significantly less than the specific gravity of the liquid medium and being substantially of botanical material is collected from the top of the separation zone. The part of the remainder of the mixture having a specific gravity significantly greater than the specific gravity of the liquid medium and containing substantially no botanical material is collected from the bottom of the zone. The intermediate portion of the mixture is removed from the first zone and passed into a second zone having a second liquid medium therein with a specific gravity greater than the specific gravity of the first liquid medium. The intermediate portion is retained in the second zone until a further intermediate portion of the mixture including botanical material separates from the remainder of the intermediate portion and an additional portion thereof absorbs an amount of the second liquid medium and approaches the specific gravity of the second liquid medium.

A part of said intermediate portion having a specific gravity significantly less than the specific gravity of the second liquid medium and being substantially of botanical material including an additional amount thereof due to the absorption of the first liquid medium by the botanical material in the first stage which thereby approaches the specific gravity of the first liquid medium, and consequently, will float upward in the second zone is then collected. The part of the remainder of the intermediate portion having a specific gravity significantly greater than the specific gravity of the second liquid medium and containing substantially no botanical material is then collected. Finally, the collected parts and additional portions are passed into the desired number of further separation zones for ultimate collection of the desired percentage of botanical material free of other components.

We have found that particles of botanical material, for example, a foliaceous material such as tobacco, will have varying specific gravities of from 0.7 to 1.4 but less than the specific gravity of sand (silicon dioxide 2.32–3.50). Since the particle sizes of tobacco fines including sand particles are relatively small, for example, less than 50 mesh, the sand particles and tobacco particles cannot be efficiently separated by screening, cycloning or single stage flotation. We have found that the efficiency of mechanical separation of tobacco fines, i.e., screening and classifying, decreases as the particle size of the tobacco fines decreases. As the particle size decreases, the tendency is to produce the same behavior characteristics so that mechanical separation is not economical or efficient.

Consequently, it has been found that where a plurality of separation zones or stages are employed with each zone containing liquid mediums of successive increasing specific gravity, the specific gravity of the tobacco can be controlled so that a large percentage of the tobacco fines may be separated from the sand and collected in acceptable form. By initially placing the tobacco in an initial liquid medium having a specific gravity intermediate the specific gravity range of the tobacco, for a time period of under 1 hour and preferably under 30 minutes, some of the tobacco fines having a low specific gravity will float and can be easily removed. However, other tobacco fines having a specific gravity either less than or greater than the specific gravity of the liquid medium will absorb liquid and will tend to approach the specific gravity of the liquid medium. This portion of the mixture will also contain a certain percentage of adhered sand to the tobacco and may be then removed from the first state and placed into a second stage containing liquid medium having a specific gravity slightly greater than the liquid medium of the first stage. By retaining this portion of the mixture in the second stage for a predetermined period of time, preferably 15 to 30 minutes, it has been found that a significant percentage of the tobacco fines will separate from the sand adhered thereto and may be collected separate from the sand. This is true even of tobacco which originally had a specific gravity greater than the specific gravity of the first liquid medium. In this condition, the tobacco fines will not have sunk to the bottom of the stage and may be removed, thereby facilitating the collection of a significant percentage of tobacco fines which are free from the sand portion of the initial mixture. Furthermore, the tendency in the second stage is the same as had been true in the first stage, that is, a portion of the tobacco fines will absorb liquid medium and will tend to attain the specific gravity of the second liquid medium.

By passing the various separated portions and further fractions of the mixture through a series of progressive stages, it has been found that a great percentage of the tobacco fines can be reclaimed. This method takes advantage of the fact that the tobacco will absorb up to 9–10 times its weight in solution and have a specific gravity about the same as the solution. By moving it into a slightly higher specific gravity solution the tobacco floats away from the sand before the tobacco comes back into equilibrium with the new specific gravity solution. Yield and separation efficiency is increased by providing an artificial density difference between the tobacco particle and the liquid in the flotation stage, then floating the particle through a stage at a rate faster than the rate at which the particle comes into equilibrium with the liquid in the stage. The sand is separated from the tobacco particle because its density is greater than the density of the liquid. The absolute density of tobacco will vary and the amount of liquid absorbed will also vary. Due to this factor, a number of stages are used in series, and the specific gravity of the liquid is increased from stage to stage. Utilizing this process and apparatus, an 80 percent to 90 percent efficiency of separation is obtained.

DESCRIPTION OF THE PREFERRED EMBODIMENTS

Figure 1:
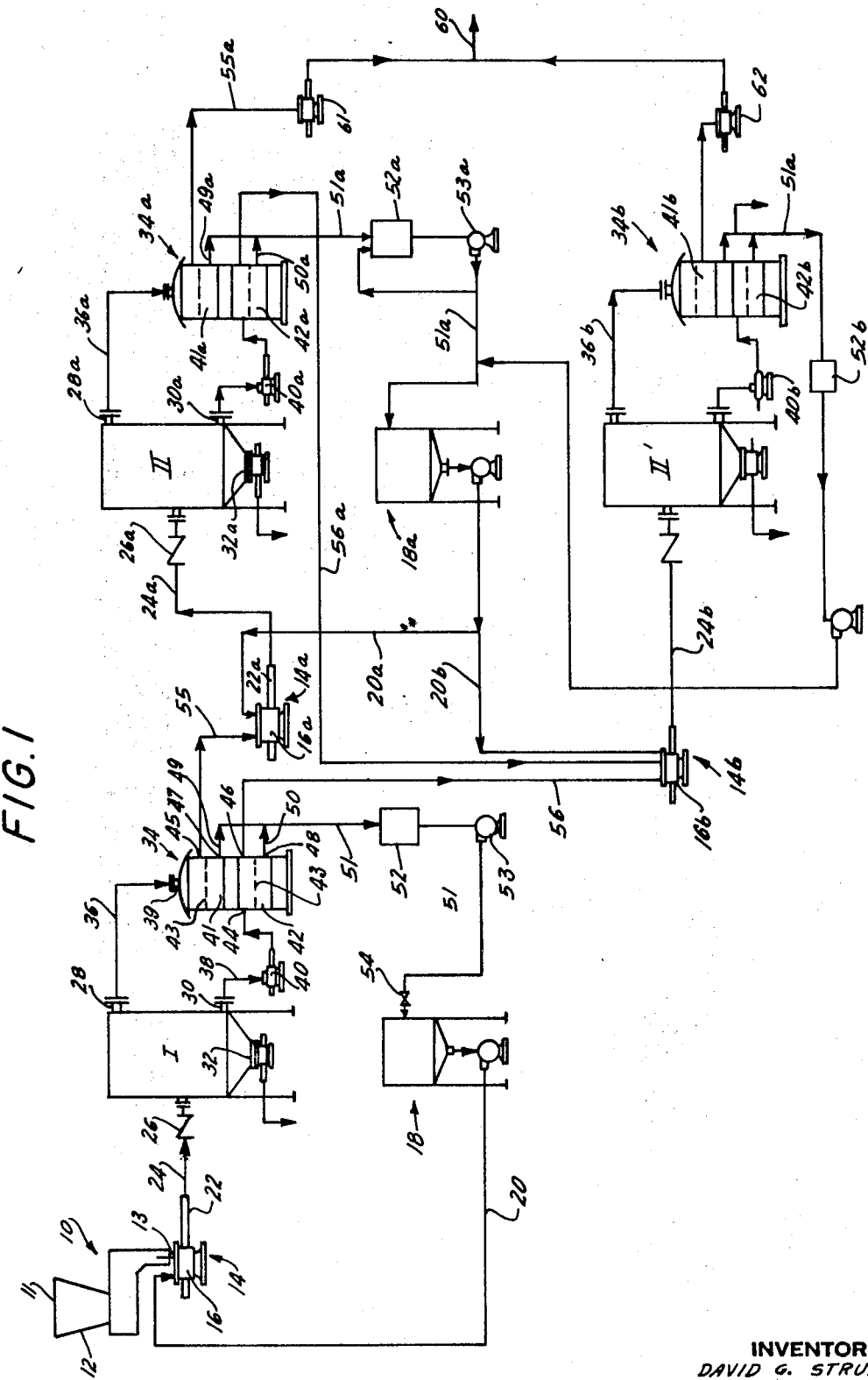
FIG. 1 is a flow diagram illustrating the process of the invention employing two separation zones.

For an initial description of the invention, attention should be directed to the process as shown in FIG. 1. To describe the operation of the process as shown in FIG. 1, a mixture of tobacco fines will be used as the material to be separated into its component parts, although other mixtures may be used employing the process set forth herein. Tobacco fines is that portion of the tobacco which is generally considered as waste material since its particle size is too small and contains an excessive proportion of nontobacco particles so that it cannot be incorporated into the tobacco process for the manufacture of tobacco smoke products. The particle size is generally about 30 mesh or smaller. A typical composition of tobacco is approximately 25 percent sand and 75 percent tobacco by weight.

The process comprises a plurality of separation zones or stages designated respectively as I, II, and II' and the liquid separation medium disposed in each zone will have, for example, specific gravities respectively of 1.08, 1.16 and 1.16. The liquid separation medium may be a water mixture of carbohydrates, polyhydric alcohols, inorganic salts, soluble polymers, or mixtures thereof, or a liquid organic hydrocarbon solvent. The liquid separation medium may include various types of compounds in a water mixture, for example, calcium chloride, hexoses, i.e., invert sugar, glycols, polyglycols, glycerine or polyethylene glycol or mixtures thereof; also suitable inert liquid organic solvents such as trichlorethylene. Additionally extracts of the material to be separated can be used as the separating medium, such as water and solvent extracts of tobacco. It well be appreciated that the specific gravities of the liquid medium in the respective zones may be adjusted within reasonable limits depending upon the mixture to be separated.

The mixture to be separated is fed into feed assembly 10 which comprises a hopper 12 having an opening 11 at its upper end for receiving the mixture and a discharge opening 13 at its lower end for discharging the mixture into feed control means 14. Feed control means 14 is provided with a mixing chamber 16 communicating with opening 13 to receive the mixture.

Liquid medium storage assembly 18 is coupled to feed means 14 so that liquid medium may pass through conduit 20 into mixing chamber 16. The mixture and the liquid medium combine in mixing chamber 16 and is discharges through exit passage 22. It has been found that many types of pumps will work satisfactorily as feed means 14 to enable substantially precise control of the feed rate through discharge passage 22, for example, a conventional proportioning pump which combines a mixing function with a thrusting action.

Discharge passage 22 communicates with separation zone I through conduit 24. A one-way valve 26 may be positioned in conduit 24 as a further control to insure proper positive flow into zone I. Conduit 24 is positioned and connected intermediate the upper and lower vertical extremities of zone I, for example, as shown near the vertical center thereof. As shown, the general configuration of the separation zones is cylindrical in shape having a conical or funnel-shaped lower end to facilitate discharge of the heavier parts or portion of the mixture being separated.

Zone I is filled with liquid separation medium having a predetermined specific gravity which is less than the specific gravity of sand, for example, 1.08. As the mixture passing from conduit 24 enters zone I, the separation action that occurs within zone I generally follows the well known principles of Stokes Law. Since the particles of tobacco fines are relatively small, they may be assumed to be generally spherical in configuration and the flow within the zone is substantially laminar, Stokes Law is readily applicable. The apparent density of tobacco ranges from about 0.730 gm./cc. to about 1.42 gm./cc. By controlling the rate of fluid flow through the separation zone at slightly less than the settling velocity of one of the components and faster than the rate of equilibrium of the other portion with the liquid medium, an optimum separation of particles of the other portion with the remainder of the mixture can be obtained. For example, in this manner, tobacco particles can be readily separated from sand. A substantial portion of tobacco particles will tend to approach the specific gravity of the liquid medium. Some of the tobacco having a low specific gravity will retain that low density and will attain a velocity in an upward direction for collection. Other particles of tobacco of greater specific gravity will attain a velocity direction so as to move downward in the zone or to remain in the center position. The tobacco particles in the upper extremity of the zone will be substantially free from sand particles and the remainder of the tobacco will have a certain amount of sand adhered thereto.

With the specific gravity of the liquid medium being intermediate the specific gravity range of the tobacco particles, and the absorption characteristics of the tobacco, the tobacco particles will absorb the liquid medium and tend to approach a specific gravity equivalent to the specific gravity of the liquid medium after a predetermined amount of time. It has been found that a time period of under 1 hour and preferably under 30 minutes is acceptable for the first stage process. If the mixture is left for too short a period in the liquid separation medium, the tobacco fines will not achieve the desirable specific gravity mentioned above particularly in regard to those tobacco fines initially having a specific gravity greater than the specific gravity of the liquid medium and will not enable the maximum recovery of the tobacco to be achieved at the later stages as will be discussed in detail below.

As shown in zone I, there are three discharge ports or openings. Discharge port 28 is located adjacent the upper end of the cylindrical segment of zone I and discharge port 30 is located adjacent the lower end of the cylindrical segment of zone I. Discharge ports 28 and 30 are generally in vertical alignment and diametrically opposed to the mixture as it enters the zone from conduit 24. The third discharge port 32 is located at the bottom of the zone. Since there is a controlled flow rate in zone I through conduit 24, the sum of the flow out of said zone through ports 28, 30 and 32 will be substantially the same.

As previously described, the tobacco particles relatively free from sand particles will travel in an upward direction toward the upper port of the cylindrical segment of zone I and will pass out of zone I through discharge port 28 due to the positive flow input of the liquid separation medium and tobacco fines entering zone 1 through conduit 24. Also, the particles of tobacco having a specific gravity substantially equal to the liquid separation medium will travel in a outward direction toward the lower port of the cylindrical segment and pass through port 30 due to the positive flow input as noted above. Due to the flow characteristics of the system a certain amount of particles of sand will also pass through port 30. The particles of sand which settle to the bottom of the zone pass through port 32.

Ports 28 and 30 are coupled to a deliquid separation assembly 34 by conduits 36 and 38. The separated particles of tobacco and liquid separation medium pass through conduit 36 and assembly 34 by means of communication between conduit 36 and opening 39 in the upper surface of assembly 34. Flow is maintained by the positive discharge coming from port 28 and gravity feed since opening 39 is below port 28.

Similarly, discharge port 30 is connected to assembly 34 by means of conduit 38 so that flow is maintained between discharge port 30 and assembly 34. To assist in maintaining the desired flow between port 30 and assembly 34, a variable speed pump 40 is connected intermediate the ends of conduit 38 and assists in controlling the flow therethrough.

Assembly 34 consists of two independent deliquification chambers 41 and 42, respectively. They may be connected in vertical tandem as shown or may be separately located. As shown, each chamber contains a screen 43 which has openings smaller than the particle size of the great majority of the particles in the mixture. As previously noted, conduit 36 communicates with opening 39 which in turn communicates with chamber 41. In a similar fashion, conduit 38 is connected to an opening 44 adjacent the upper end of lower chamber 42 thereby assuring that the liquid medium and particle mixture discharge from port 30 will be separately deliquified. To aid in the separation of the liquid medium and particles, a motor (not shown) is connected to assembly 34. The vertical tandem relationship of chambers 41 and 42 as shown enables the utilization of one motor with chambers 41 and 42. It is readily apparent that a major portion of liquid will pass through screen 43 to the bottom of chambers 41 and 42 while the particles, substantially free from liquid other than the liquid absorbed by the tobacco particles which enable the particles to attain the specific gravity discussed above, will remain above screen 43. Due to the flow characteristics of the moving screen, a portion of the liquid medium will remain above screen 43 during its passage through assembly 34 and will pass out of each chamber 41 and 42 with the separated particles through openings 45 and 46.

The major portion of the liquid medium passing through screen 43 will discharge through openings 47 and 48 adjacent the lower ends of chambers 41 and 42, respectively.

The liquid medium exiting from assembly 34 through openings 47 and 48 passes through conduits 49 and 50, respectively, into conduit 51. Conduit 51 containing the liquid medium is connected to liquid storage assembly 18 for recycle and reuse. To assist in maintaining the desired flow characteristics in the portion of the flow circuit, a surge tank 52 is positioned and connected intermediate the ends of conduit 51. A pump 53 is also connected to conduit 51 and is utilized to maintain a predetermined volume of liquid medium within surge tank 52. A valve 54 is connected to conduit 51 adjacent the point where conduit 51 adjacent the point where conduit 51 is connected to liquid medium storage assembly 18 and serves as an additional flow regulating means for the liquid medium passing through conduit 51.

The separated particles and small amount of liquid medium which passes out of assembly 34 through opening 45 is conducted by conduit 55 to and enters feed-mixing chamber 16a of feed mixing means 14a. Feed-mixing means 14a is similar in construction and operation to feed-mixing means 14 and in turn is utilized as a feeding means for zone II of the system. All parts employed in conjunction with zone II which are similar in construction and operation to respective parts used in zone I are similarly numbered with the addition of the subscript "a."

The controlled flow rate of the system connected to separation zone II is substantially equal to the flow of material separated from chamber 41 of assembly 34. The steps of separation are also the same and follow the same pattern as evidenced by the similarly numbered parts of the system. The major difference between the system employed in conjunction with zone II in contrast to the system employed in conjunction with zone I is in the specific gravity of the liquid medium. That is, the specific gravity of the liquid medium in zone II is higher than the specific gravity of the medium in zone I.

The separated particles and small amount of liquid medium which pass out of opening 46 of chamber 42 is conducted to feed mixing chamber 16b of feed means 14b through conduit 56. Since the separated mixture entering chamber 16b contains a greater proportion of particles of sand than the separated mixture entering mixing chamber 16a an auxiliary separation zone II' and connecting system is provided. By keeping the separated mixture discharged through opening 45 of assembly 34 separate from the mixture discharged through opening 46 closer control can be maintained over each of the two separated mixtures during further processing thereof. This provides a further means for controlling the resultant product. In this manner, should the proportion of sand particles be in excess of that desirable in a finished product after having passed through auxiliary separation zone II', the further separated mixture can be discarded recycled or further processed through an additional separation zone. Since the operation and parts of separation zone II' are similar to separation zones I and II, like parts will be similarly numbered with the subscript "b."

The recycle system 18a employed in conjunction with zone II also serves as the recycle system for zone II' because the specific gravity of the liquid medium of auxiliary zone II' is the same as that employed for zone II. In addition to the separated mixture conducted by conduit 56 from chamber 42 into mixing chamber 16b, the separated mixture from chamber 42a is also conducted to mixing chamber 16b by conduit 56a. While the mixture conducted by conduit 56 is further separated in zone II, as this mixture has absorbed a material of a specific gravity lower than the specific gravity of the medium in zone II', the mixture conducted through conduit 56a is subjected only to additional contact, and some additional recovery, as the specific gravity of the absorbed medium from zone II is essentially the same as that in zone II'. The liquid medium feed-mixing chamber 16b is connected by means of connected conduit 20a and 20b from liquid medium storage assembly 18a. It is readily apparent from the drawing that the liquid medium discharged from assemblies 34a and 34b is conducted to storage assembly 18a in a similar manner as described in conjunction with zone I and the similar parts thereof.

The separated particles of tobacco substantially free from particles of sand discharged from chamber 41a and 41b are conducted through conduits 55a and 55b to a commonly connected conduit 60 as the finished product of the process. Suitable pumps 61 and 62 are connected intermediate the ends of conduits 55a and 55b respectively to facilitate the maintenance of proper flow rate for discharge of the product into conduit 60 and subsequent recovery.

The separated mixture discharged from chamber 42b and discharge ports 32, 32a and 32b is generally considered to be waste materials and is discharged.

Since the specific gravity of the liquid medium in zones II and II' is slightly greater than the specific gravity of the liquid medium in zone I, the tobacco particles which enter zones II and II' have a predetermined specific gravity attained during residence in zone I which includes a certain percentage of tobacco which would normally have had a specific gravity significantly greater than the specific gravity of the second liquid medium and would normally have sunk. However, the absorption of liquid medium in the first stage has changed the apparent specific gravity of the tobacco so that it will float in the second liquid medium for a period of time, separate from sand, and be collected. This greatly increases the percentage of tobacco that may be recovered. During the period of time it takes the tobacco particles to reach equilibrium by absorption of the second liquid medium, the tobacco particles will be further separated from the sand which has a specific gravity considerably greater than the specific gravity of the second liquid medium. The tobacco thus obtained will be substantially free from particles of sand and it may be collected through conduits 55a and 55b respectively. It has been found that retaining the tobacco particles of a period of 15 to 30 minutes in zone II and II' will achieve desirable results. This is in respect to the examples included in the disclosure as presented herein. Naturally, an additional fraction of tobacco particles will absorb sufficient second liquid medium so as to be adaptable for passage into further separation zones.

Figure 2:
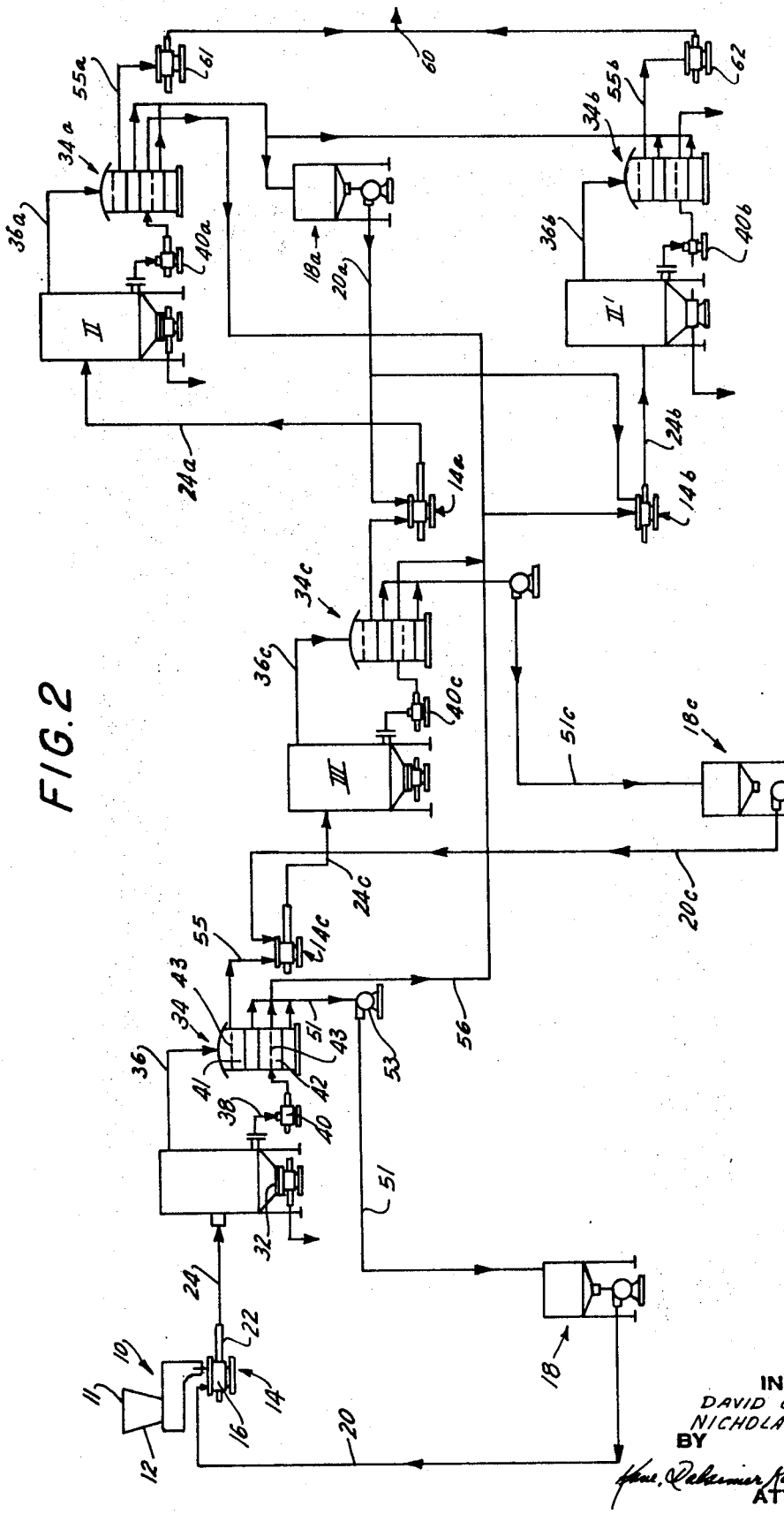
FIG. 2 is similar to FIG. 1 but illustrating the process employing three separation zones.

The illustrated embodiment of FIG. 2 is similarly constructed and operates in a similar fashion as the embodiment of FIG. 1 with the addition of a further separation zone III located and connected between zone I and the combination of zones II and II' thereby providing a further refining step in the overall separation process. Since the operation and parts of separation zone III are similar to separation zones I, II and II', like parts will be similarly numbered with the subscript "c."

With the addition of a third separation zone, a medium having a third specific gravity is utilized to preserve the continuity of liquid mediums having successively higher specific gravities as the mixture passes through successive separation zones. Consequently, in accordance with procedures followed and previously discussed in connection with FIG. 1, zones I, III and the combination of II and II' will contain liquid mediums having progressively higher specific gravities.

Figure 3:
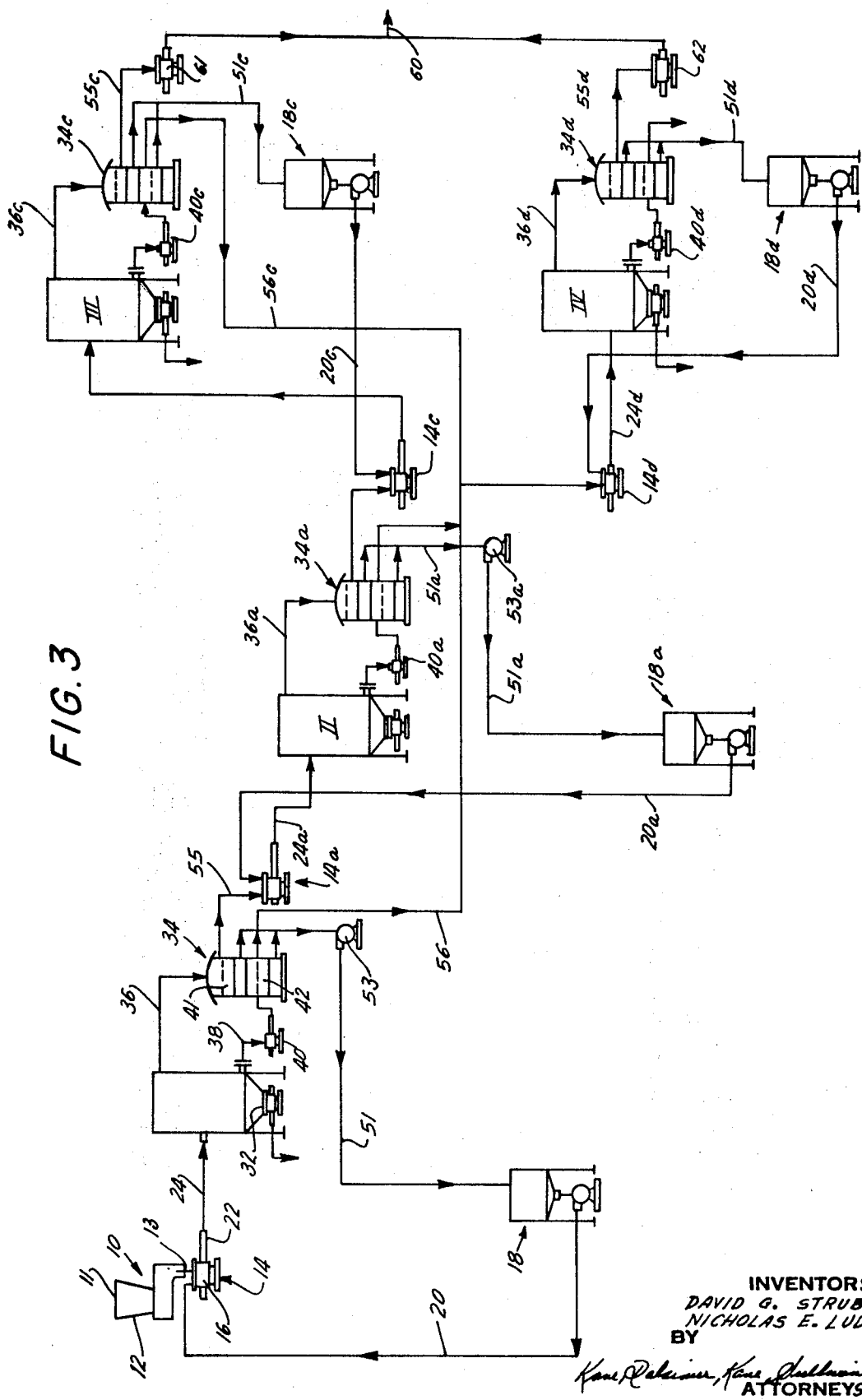
FIG. 3 is similar to FIG. 1 but illustrating the process employing for separation zones.

The illustrated embodiment of FIG. 3 is similarly constructed and operates in a similar fashion as the embodiments of FIGS. 1 and 2. The principal difference lies in the arrangement of the separation zones. In the embodiment of FIG. 3, there is provided four separate separation zones. Each of these zones has a separate liquid medium storage recycle system so that the liquid medium of each zone has a different specific gravity. The specific gravity in each successive zone is progressively higher in accordance with the principals of the invention as previously discussed. It should be noted that the specific separation zones are respectively designated as zones I through IV. Furthermore, zone IV is employed in the overall system as a separation zone for the further processing of the separated portions of the mixture discharge from the lower chambers of the deliquification assemblies of zones I, II, and III in a similar manner as zone II' is utilized in regard to the embodiment of FIG. 1.

Since the operation and parts of separation zone IV are similar to separation zones I, II and III, like parts will be similarly numbered with the subscript "d."

For a better understanding of the invention, the following specific examples illustrate the liquid separation of a mixture of particles having differing specific gravities and absorption characteristics.

EXAMPLE 1

A sample of tobacco fines having a particle size which passes through a 50 mesh U.S. Standard screen containing 325 gms. of tobacco and 125 gms. of sand is passed through two separation stages as shown in FIG. 1. The liquid medium consists of a water solution of invert sugar and is prepared so that the specific gravity of the solution in stage 1 is 1.08 and stages II and II' is 1.16.

The tobacco fines are passed into stage 1 at a controlled rate such that the desired specific gravity for the tobacco fines is attained for collection and passage into stages II and II', as discussed above, so that optimum separation of the tobacco particles from the sand particles is obtained. The resultant product recovered comprising the floated material from the second stages (II and 11') was 161 gms. of tobacco and 6 gms. of sand.

EXAMPLE 2

The same procedure is followed as in example 1 to separate a mixture of tobacco particles from sand particles except that the mixture is processed as shown in FIG. 2.

The mixture having a particle size which passes through a 30 mesh U.S. Standard screen is separated into four equal samples, each sample containing 390 gms. of tobacco and 110 gms. of sand. Each sample is processed employing in each stage a liquid separation medium of invert sugar in water having a specific gravity as set forth in table 1 below, the recovered tobacco being combined from stages II and II'.

Sample 1is passes through stages I, III, II and II' with each stage having an invert sugar solution therein of increasing specific gravity, respectively, 1.08, 1.16, 1.24 and 1.24. Samples 2, 3 and 4 are passed through each stage having invert sugar solution therein of the same specific gravity, respectively, 1.24, 1.16 and 1.08. It is readily apparent that the yield of tobacco recovered from sample 1 substantially exceed the yields of tobacco recovered from samples 2, 3 and 4, thus clearly demonstrating the principle of the invention herein. That is, that by controlling the absorption of the tobacco in one stage to change the specific gravity of the portion of the tobacco and then progressively positioning the tobacco in successive stages of increasing specific gravities a greater percentage of tobacco will float free of sand for collection. If the specific gravity of the successive stages are equal, the system is similar to a sink-float process in which case a considerably lower amount of tobacco is collected.

TABLE I.—SPECIFIC GRAVITY OF LIQUID IN STAGE

| Por- | Amount (gms.) starting material | | Stage | | | | Floated material, gms. | |
|---|---|---|---|---|---|---|---|---|
| tion | Tobacco | Sand | I | III | II | II' | Recovered tobacco | Sand |
| 1 | 390 | 110 | 1.08 | 1.16 | 1.24 | 1.24 | 234 | 4 |
| 2 | 390 | 110 | 1.24 | 1.24 | 1.24 | 1.24 | 148 | 4 |
| 3 | 390 | 110 | 1.16 | 1.16 | 1.16 | 1.16 | 63 | 3 |
| 4 | 390 | 110 | 1.08 | 1.08 | 1.08 | 1.08 | 37 | 3 |

EXAMPLE 3

The same procedure is followed as in examples 1 and 2 except that the tobacco mixture is processed as in FIG. 3. The liquid separation medium employed in stages I through IV, respectively, in an invert sugar solution in water and having increasing specific gravities, respectively, 1.08, 1.16, 1.20 and 1.28.

Four 500 gm. samples of tobacco and sand are processed, with each sample varying in sand content. The particle sizes of samples 1, 2 and 4 being substantially the same, each sample passing through a 50 mesh U.S. Standard screen and sample 2 having a range of particle sizes which are classified through U.S. Standard screens ranging from 16 mesh through 325 mesh.

From table II below, it is readily apparent that the recovery of tobacco particles is highly efficient when compared to the amount of tobacco particles initially contained in the sample and that the removal of sand particles is also highly efficient, even when the sample contains sand particles in excess of 45 percent of the original mixture.

TABLE II

| | Amount of Starting Material | | Floated Material | |
|---|---|---|---|---|
| Test | Tobacco | Sand | Recovered Tobacco | Sand |
| 1 | 425 gms. | 73 gms. | 386 gms. | 8 gms. |
| 2 | 374 gms. | 126 gms. | 332 gms. | 9 gms. |
| 3 | 344 gms. | 156gms. | 313 gms. | 11 gms. |
| 4 | 262 gms. | 238 gms. | 202 gms. | 18 gms. |

EXAMPLE 4

The same procedure is followed as in example 1except that the mixture to be separated is ground corn meal and sand, containing 343 gms. of corn meal and 110gms. of sand, and having a particle size which passes through a 50 mesh U.S. Standard screen, and is processed as shown in FIG. 1. The specific gravity of the liquid separation medium, an invert sugar solution in water, in stage I is 1.08 and in stages II and II' is 1.24. The resultant product which comprises the floated material from stages II and II' is 164 gms. of corn meal and 2 gms. of sand.

EXAMPLE 5

The same procedure is followed as in example 3 except that the mixture contains particles of cinnamon and sand, containing 167 gms. of cinnamon and 46 gms. of sand and having a particle size which passes through a 30 mesh U.S. Standard screen, and is processed as shown in FIG. 3. The specific gravity of the liquid separation medium, an invert sugar solution in water, in stage I is 1.08; in stage II, 1.16; in stage III, 1.20 and in stage IV, 1.25. The resultant product which comprises the floated material, cinnamon, from the third and fourth stages contains 130 gms. of cinnamon and 1 gm. of sand.

While we have indicated that the mixture to be separated has relatively the same particle size, the range of particle sizes contained in the mixture may vary widely, for example, tobacco fines obtained from the manufacturing process contains a mixture of particles from about less than 6 mesh with a majority of the particles having a size of about 30 mesh or less. Also, passing said mixture into a first separation zone having a liquid medium therein with a specific gravity intermediate the specific gravity range of the botanical material;

retaining said mixture in said first zone until an intermediate portion of said mixture including botanical material absorbs an amount of said liquid medium and approaches the specific gravity of the liquid medium and separates from the remainder of said mixture;

collecting the part of the remainder of said mixture having a specific gravity significantly less than the specific gravity of the liquid medium and being substantially of botanical material from the top of said separation zone and collecting the part of the remainder of said mixture having a specific gravity greater than the specific gravity of the liquid medium and containing substantially no botanical material from the bottom of said zone;

removing the intermediate portion of said mixture from said first zone and passing it into a second separation zone having a second liquid medium therein with a specific gravity greater than the specific gravity of the previous liquid medium and intermediate the specific gravity range of said intermediate portion;

retaining the intermediate portion in said second zone until a further intermediate portion of said mixture including botanical material separates from the remainder of said intermediate portion and an additional fraction thereof absorbs an amount of said second liquid medium and approaches the specific gravity of the second liquid medium;

collecting the part of the remainder of said intermediate portion having a specific gravity significantly less than the specific gravity of the second liquid medium and being substantially of botanical material including an additional amount thereof due to the absorption of the first liquid medium by the botanical material in the first stage which thereby approaches the specific gravity of the first liquid medium and, consequently, will float upward in said second zone to facilitate collection thereof;

collecting the part of the remainder of said intermediate portion having a specific gravity significantly greater than the specific gravity of the second liquid medium and containing substantially no botanical material; and in a similar manner passing the collected parts and additional fraction of said intermediate portion into the desired number of further separation zones having appropriate specific gravities for ultimate collection of the desired percentage of botanical material free of other components.

2. The invention in accordance with claim 1 wherein said mixture is particles of tobacco and sand, said particles having a size substantially not greater than 30 mesh, the tobacco having an initial specific gravity of approximately 0.7 to 1.4 prior to insertion into said first liquid medium having a specific gravity intermediate the specific gravity range of said tobacco and being able to absorb liquid medium so as to alter the specific gravity of the tobacco, and the sand having an initial specific gravity of approximately 2.32 to 3.50 which is greater than the successive liquid mediums into which it is placed and which will absorb substantially no liquid medium.

the mixture to be separated may contain not only particles of foliaceous material but may include particles of various non-foliaceous materials but other botanical materials such as corn meal or cinnamon.

We claim:

1. Method for the liquid separation of a mixture having a plurality of component parts of differing specific gravities and absorption characteristics, one of said component parts being a botanical material comprising:

3. The invention in accordance with claim 1 wherein the liquid separation medium is a material selected from the group consisting of an inert liquid organic solvent, an extract of said botanical material, and water together with a water soluble polymer, carbohydrate, polyhydric alcohol, inorganic salt and mixtures thereof.

4. The method for the liquid separation of a mixture having a plurality of component parts of differing specific gravities and absorption characteristics, one of said component parts being a foliaceous material, comprising:

passing said mixture into a first separation zone having a liquid medium therein with the liquid medium having a specific gravity intermediate the specific gravity range of the foliaceous material introduced therein;

retaining said mixture in said first zone until an intermediate portion of said mixture including foliaceous material absorbs an amount of said liquid medium and approaches the specific gravity of the liquid medium and separates from the remainder of said mixture;

collecting the part of the remainder of said mixture having a specific gravity significantly less than the specific gravity of the liquid medium and being substantially of foliaceous material from the top of said separation zone and collecting the part of the remainder of said mixture having a specific gravity significantly greater than the specific gravity of the liquid medium and containing substantially no foliaceous material from the bottom of said zone;

removing the intermediate portion of said mixture from said first zone and passing it into a second separation zone having a second liquid medium therein with a specific gravity greater than the specific gravity of the previous liquid medium and intermediate the specific gravity range of said intermediate portion;

retaining the intermediate portion in said second zone until a further intermediate portion of said mixture including foliaceous material separates from the remainder of said intermediate portion and an additional fraction thereof absorbs an amount of said second liquid medium and approaches the specific gravity of the second liquid medium;

collecting the part of the remainder of said intermediate portion having a specific gravity significantly less than the specific gravity of the second liquid medium and being substantially of foliaceous material including an additional amount thereof due to the absorption of the first liquid medium by the foliaceous material in the first stage which thereby approached the specific gravity of the first liquid medium and, consequently, will float upward in said second zone to facilitate collection thereof;

collecting the part of the remainder of said intermediate portion having a specific gravity significantly greater than the specific gravity of the second liquid medium and containing substantially no foliaceous material; and in a similar manner passing the collected parts and additional fraction of said intermediate portion into the desired number of further separation zones having appropriate specific gravities for ultimate collection of the desired percentage of foliaceous material free of other components.

UNITED STATES PATENT OFFICE
CERTIFICATE OF CORRECTION

Patent No. 3,608,717          Dated September 28, 1971

Inventor(s) David G. Strubel et al.

It is certified that error appears in the above-identified patent and that said Letters Patent are hereby corrected as shown below:

Column 1, line 26, cancel "Invention" and insert -- INVENTION --. Column 3, line 31, "well" should read -- will --; line 46, "discharges" should read -- discharged --. Column 5, lines 33 and 34, cancel "adjacent the point where conduit 51". Column 7, line 59, cancel "Sample lis passes" and insert -- Sample 1 is passed --. Column 9, cancel lines 61-64. Column 8, line 75, after "Also,", insert -- the mixture to be separated may contain not only particles of foliacious material but may include particles of various non-foliacious materials but other botanical materials such as corn meal or cinnamon. --. Column 10, cancel lines 1-5. Column 9, line 1, before "passing" insert -- We claim:

1. Method for the liquid separation of a mixture having a plurality of component parts of differing specific gravities and absorption characteristics, one of said component parts being a botanical material comprising: --.

Signed and sealed this 8th day of May 1973.

(SEAL)
Attest:

EDWARD M. FLETCHER, JR.
Attesting Officer

ROBERT GOTTSCHALK
Commissioner of Patents